United States Patent
Klomp et al.

[11] Patent Number: 5,546,246
[45] Date of Patent: Aug. 13, 1996

[54] MAGNETIC TAPE DRIVE WITH END-OF-TRACK BLOCK DIRECTORY

[75] Inventors: Charles B. Klomp, Saline; Mark R. Ayers, Whitmore lake; Daniel J. Canterbury, Howell, all of Mich.

[73] Assignee: Exabyte Corporation, Boulder, Colo.

[21] Appl. No.: 181,317

[22] Filed: Jan. 13, 1994

[51] Int. Cl.$^6$ .................................................. G11B 15/18
[52] U.S. Cl. ......................................... 360/72.2; 360/74.1
[58] Field of Search ................................. 360/72.2, 72.1, 360/69, 78.02, 72.3, 71, 74.1, 74.2, 74.3, 74, 74.5, 74.6, 74.7; 369/47

[56] References Cited

U.S. PATENT DOCUMENTS

| | | | |
|---|---|---|---|
| 4,858,039 | 8/1989 | Mintzlaff | 360/72.2 |
| 5,034,914 | 7/1991 | Osterlund | 360/72.2 X |
| 5,325,370 | 6/1994 | Cleveland et al. | 360/53 X |

OTHER PUBLICATIONS

QIC Document No. 92–70 QIC (Feb. 10, 1993).

*Primary Examiner*—Aristotelis Psitos
*Assistant Examiner*—James T. Wilson
*Attorney, Agent, or Firm*—Nixon & Vanderhye

[57] ABSTRACT

A magnetic tape drive system (20) records a directory block (CL) at a predetermined position on tape (22), and preferably at the beginning of tape. The directory includes, for each recorded track on tape (22), a data block number of the data block recorded at an end of the track. Preferably a plurality of copies of directory block (CL) are recorded, preferably in reverse direction. Upon receipt of a command to locate a target data block recorded on tape (22), a processor (102) directs a transport controller (82) to position a read element (30R) at the predetermined position on tape (22) for reading the directory. The read element reads the directory from tape (22). The processor (102) compares the target block number with the data block numbers stored in the directory and, in response to the comparison, causes an element positioner (74) via the transport controller (82) to position the read element with respect to the width of the tape (22) so as to read the track upon which the data block having the target data block number is recorded. The track upon which the target data is located is then sequentially searched for the target data block.

16 Claims, 7 Drawing Sheets

| LB Track00 | LB Track01 | LB Track02 | LB Track03 | LB Track04 | LB Track05 | LB Track06 | LB Track07 |
|---|---|---|---|---|---|---|---|
| LB Track08 | LB Track09 | LB Track10 | LB Track11 | LB Track12 | LB Track13 | LB Track14 | LB Track15 |
| LB Track16 | LB Track17 | LB Track18 | LB Track19 | LB Track20 | LB Track21 | LB Track22 | LB Track23 |
| LB Track24 | LB Track25 | LB Track26 | LB Track27 | LB Track28 | LB Track29 | LB Track30 | LB Track31 |
| LB Track32 | LB Track33 | LB Track34 | LB Track35 | LB Track36 | LB Track37 | LB Track38 | LB Track39 |

FIG. 7

| 7F | 49 | 00 | 60 | 91 | 00 | 54 | D7 | 00 | 06 | 1C | 01 | F0 | 61 | 01 | FD | A6 | 01 | 83 | EC | 01 | C6 | 31 | 02 |
|---|---|---|---|---|---|---|---|---|---|---|---|---|---|---|---|---|---|---|---|---|---|---|---|
| 14 | 77 | 02 | 4A | BC | 02 | D6 | 01 | 03 | 53 | 47 | 03 | C1 | 8D | 03 | CB | D2 | 03 | D5 | 18 | 04 | 74 | 5E | 04 |
| 46 | A4 | 04 | 16 | EA | 04 | B0 | 2F | 05 | 32 | 75 | 05 | 67 | BB | 05 | BD | 00 | 06 | 68 | 46 | 06 | BE | 8B | 06 |
| A8 | D0 | 06 | 48 | 16 | 07 | 21 | 5B | 07 | C3 | A0 | 07 | B9 | E5 | 07 | 23 | 2B | 08 | 0A | 40 | 08 | 00 | 00 | 00 |
| 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |

FIG. 8

| | |
|---|---|
| Last Block Track 00: 00497F | Last Block Track 20: 05BB67 |
| Last Block Track 01: 009160 | Last Block Track 21: 0600BD |
| Last Block Track 02: 00D754 | Last Block Track 22: 064668 |
| Last Block Track 03: 011C06 | Last Block Track 23: 068BBE |
| Last Block Track 04: 0161F0 | Last Block Track 24: 06D0A8 |
| Last Block Track 05: 01A6FD | Last Block Track 25: 071648 |
| Last Block Track 06: 01EC83 | Last Block Track 26: 075B21 |
| Last Block Track 07: 0231C6 | Last Block Track 27: 07A0C3 |
| Last Block Track 08: 027714 | Last Block Track 28: 07E5B9 |
| Last Block Track 09: 02BC4A | Last Block Track 29: 082B23 |
| Last Block Track 10: 0301D6 | Last Block Track 30: 08400A |
| Last Block Track 11: 034753 | Last Block Track 31: blank |
| Last Block Track 12: 038DC1 | Last Block Track 32: blank |
| Last Block Track 13: 03D2CB | Last Block Track 33: blank |
| Last Block Track 14: 0418D5 | Last Block Track 34: blank |
| Last Block Track 15: 045E74 | Last Block Track 35: blank |
| Last Block Track 16: 04A446 | Last Block Track 36: blank |
| Last Block Track 17: 04EA16 | Last Block Track 37: blank |
| Last Block Track 18: 052FB0 | Last Block Track 38: blank |
| Last Block Track 19: 057532 | Last Block Track 39: blank | ns
MAGNETIC TAPE DRIVE WITH END-OF-TRACK BLOCK DIRECTORY

BACKGROUND

1. Field of Invention

This invention pertains to method and apparatus for locating selected blocks of data on an information storage medium, and particularly to such method for locating blocks of data stored in streaming or "serpentine" fashion on magnetic tape.

2. Related Art and Other Considerations

For several decades magnetic tape drives have been employed as peripheral devices for storage (e.g., back-up) for computer and data processing systems. In one type of magnetic tape drive, known as a streaming or serpentine drive, tape is horizontally moved past a head having at least one write element (e.g., a transducer or "gap"). As the tape moves past the head in a forward direction, a track is recorded/read parallel to the direction of movement of the tape (e.g., horizontal tracks). When the head encounters an end of the tape, the position of head (and consequentially the write element) is changed relative to the width of the tape. The tape is then moved past the head in a reverse direction, with another track then being recorded. Recording continues in similar manner for a plurality of track positions located across the width of the tape. The number of tracks is dependent upon characteristics of the head and the width of the tape, there being as many as forty tracks on tapes handled by some tape drives.

User data is received by the tape drive from the computer or data processing system. The user data is formatted (e.g., by a formatter of the drive) into a sequence of data blocks. Typically, each data block contains not only an allocated portion of the user data, but additional information such as a preamble, data block header, and a postamble (including, e.g., error correction information). The data block header in turn includes a block number or block address which is assigned in consecutive order of generation by the formatter. The data blocks are then recorded on the tape in sequential manner such that, upon reading of the tape, the user data can be recovered in the order in which they were recorded (i.e., in order of the data block numbers).

In many instances it is desirable to move the head so that a read element also provided on the head is positioned to read a specified data block (usually specified by block number). This can be crudely done by starting at the beginning of the first recorded track and reading the entire tape until the specified block is read. For most applications, such a sequential search is unacceptably slow.

U.S. Pat. No. 4,858,039 to Mintzlaff (incorporated herein by reference) purports to locate a selected block of data by first moving the head to the track in which the selected block supposedly resides, and then conducting a block-by-block search on that track until the selected block is found. To locate the proper track, a magnetic head is moved substantially incrementally vertically from one data track to another; at each vertical increment reading a block number encountered on the track after vertical movement; and, comparing the block number so read to the block number of the desired data block. For successive vertical moves, Mintzlaff examines former and current distances from the desired data block to determine when the head should be over a track that contains the desired data block.

Tandberg Data A/S has espoused QIC 92-70 (Feb. 10, 1993) as a proposal for purportedly enabling faster seeking of the end of recording (EOR) on a magnetic tape. According to QIC 92-70, four identical "ID frames" are recorded as the first four flames on track set 0. Each ID frame comprises ID blocks and ECC blocks. Each ID block contains a table which includes such values as the track set number of end of recording; the end of recording position in inches from BOT; the track set number of an APPEND point; and, the APPEND point in inches from BOT. The ID frames are updated after each record operation. Thus, QIC 92-70 requires a splicing operation upstream from user data each time the ID frames are updated. A splicing operation means that new data will be recorded in the ID frames. Care must be taken that this splicing operation does not encroach into the first block of user data.

SUMMARY

A magnetic tape drive system records a directory block or cartridge log block at a predetermined position on tape, and preferably outside of user data at the beginning of tape. The directory includes, for each recorded track on the tape, a data block number of the data block recorded at an end of the track. Preferably a plurality of copies of the directory block are recorded, preferably in reverse direction. Upon receipt of a command to locate a target data block recorded on the tape, a processor directs a transport controller to position a read element at the predetermined position on the tape for reading the directory. The read element reads the directory from the tape. The processor then compares the target block number with the data block numbers stored in the directory and, in response to the comparison, causes an element positioner via the transport controller to position the read element with respect to the width of the tape so as to read the track upon which the data block having the target data block number is recorded. The track upon which the target data is located is then sequentially searched for the target data block.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
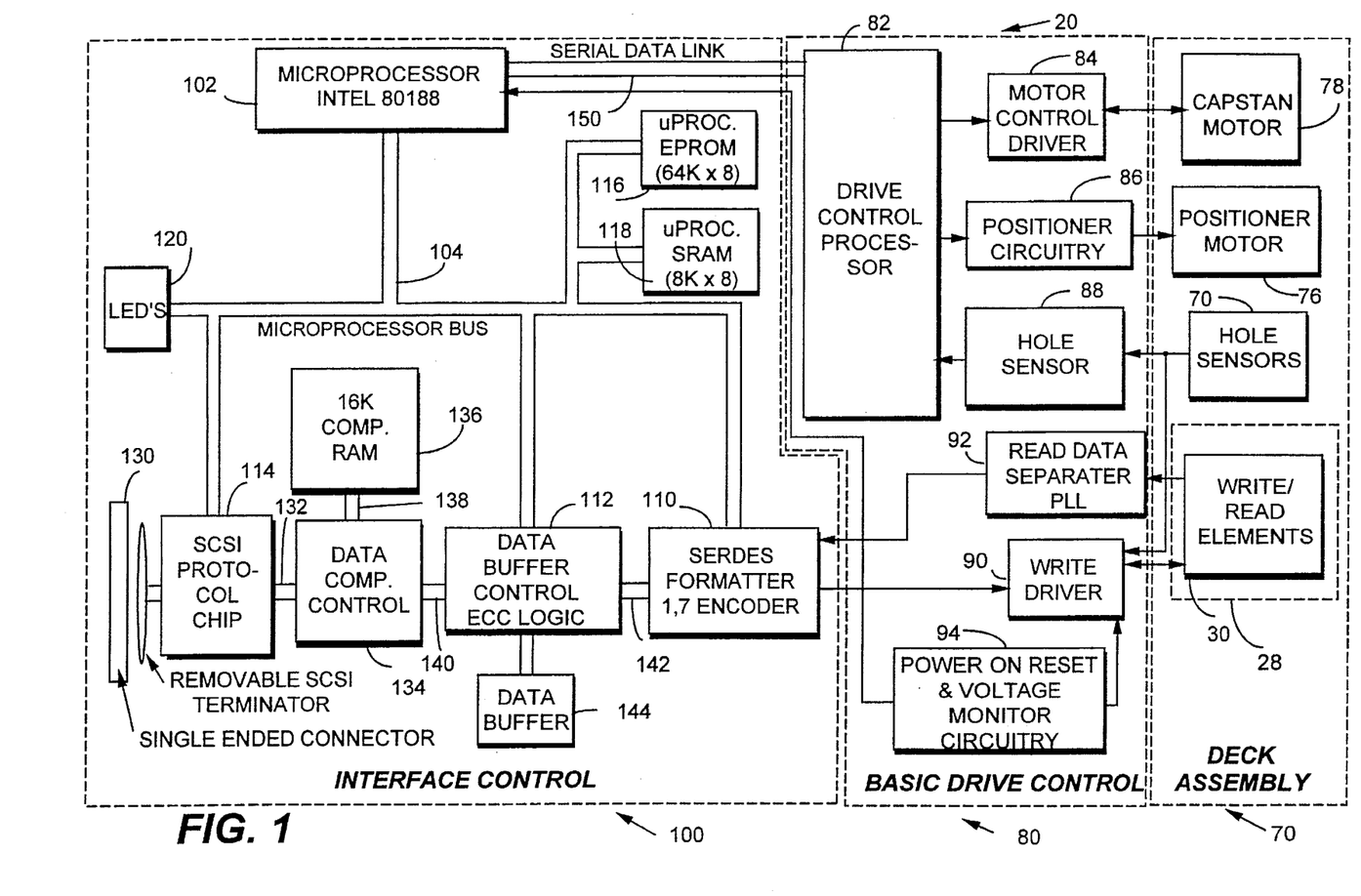
FIG. 1 is a schematic block diagram of a storage medium handling drive according to an embodiment of the invention.
Figure 2:
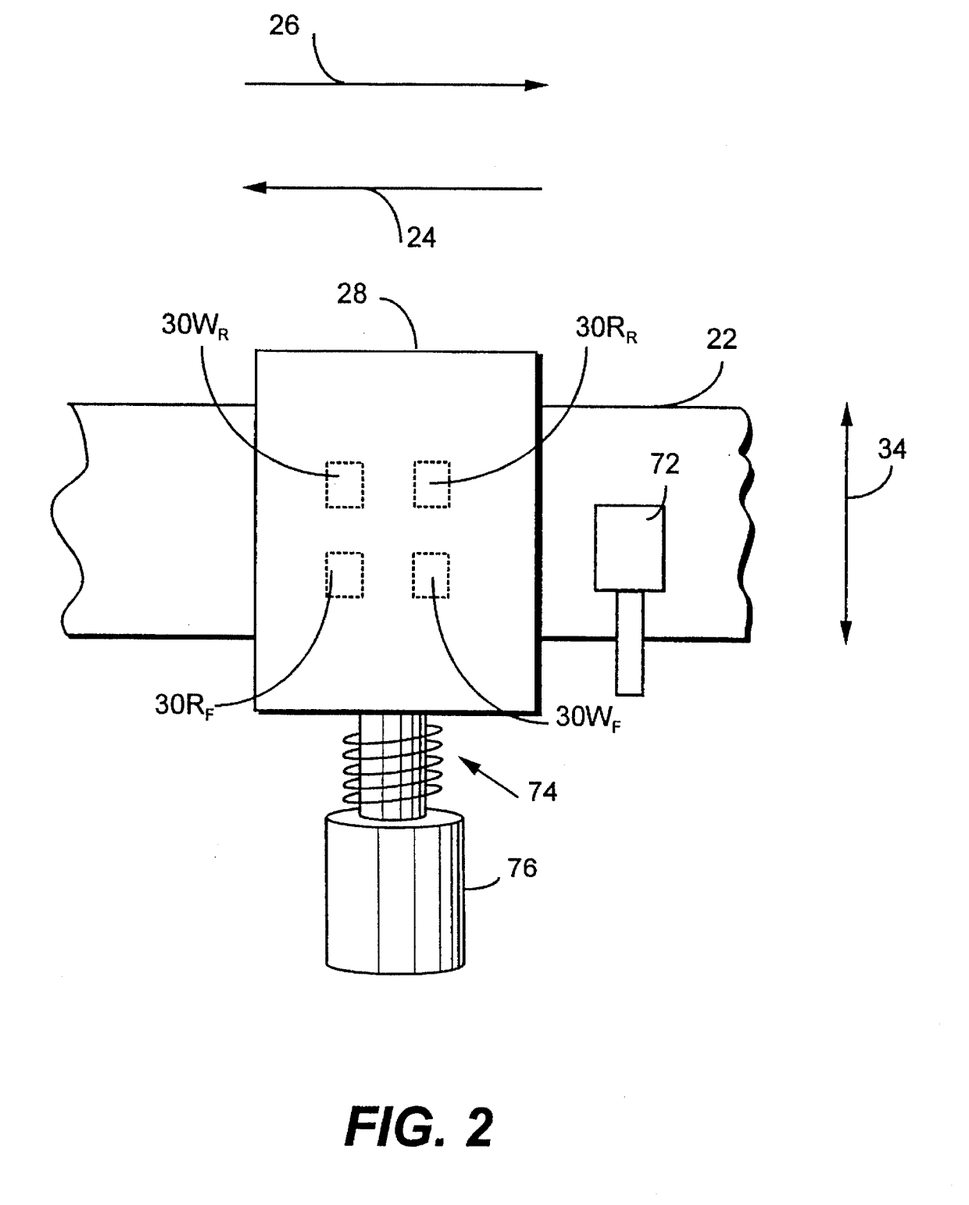
FIG. 2 is a schematic view of a head unit relative to a magnetic tape storage medium.
Figure 3:
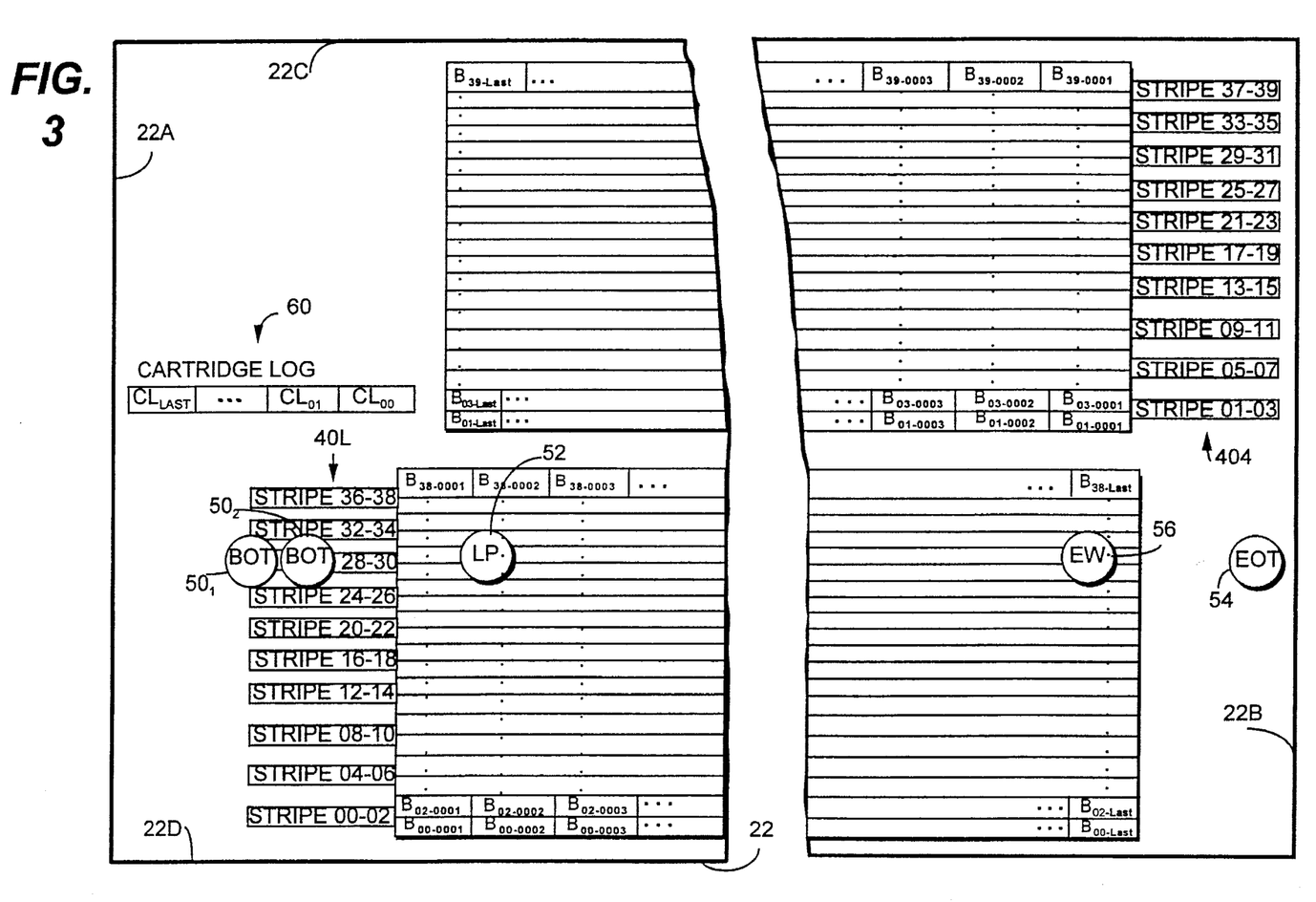
FIG. 3 is an illustration of a format in which information is recorded on a storage medium by the drive of FIG. 1.

FIG. 1 shows a magnetic tape drive system 20 for recording information on (and reading recorded information from) an information storage medium which, in the illustrated embodiment, is magnetic tape 22. As shown in FIG. 2, in drive system 20 tape 22 is transported either in a forward direction (denoted by arrow 24) or a reverse direction (denoted by arrow 26) past head unit 28. In a recording mode, depending on direction of movement of tape 22, one of two write elements $30W_F$, $30W_R$ (mounted on head unit 28 in proximity to tape 22) causes magnetic signals to be recorded in a horizontal track on tape 22. As explained hereinafter, head unit 28 is vertically adjustable (in the direction depicted by arrow 34). In a recording mode, repeated vertical adjustment of head unit 28 yields a plurality of parallel, horizontal tracks $B_{00}$ through $B_{39}$ as illustrated in FIG. 3. Given such a pattern of track recording, the drive system 20 is known as a streaming or serpentine magnetic tape drive system.

A format of tape 22 is shown in greater detail in FIG. 3. Tape 22 has a leading edge 22A, a trailing edge 22B, a top edge 22C, and a bottom edge 22D. When recorded, tape 22 is conceptualized as having twenty stripes written thereon, including an upper or odd set 40U of stripes (i.e., Stripe 01–03, Stripe 05–07, . . . Stripe 37–39) and a lower or even set 40L of stripes (i.e., Stripe 02–04, Stripe 06–08, . . . Stripe 36–38). Two tracks are formed on opposite edges of each stripe. For example, Stripe 00–02 has track $B_{00}$ formed on its lower edge and track $B_{02}$ formed on its upper edge.

Near its beginning edge 22A and near the beginning of Stripe 28–30, tape 22 has two "beginning of tape" ("BOT") holes $50_1$, $50_2$ punched therethrough. Vertically aligned with and downstream from (i.e., in the forward direction) the "BOT" holes $50_1$, $50_2$ is a "load point" ("LP") hole 52. Near its trailing edge 22B, tape 22 has an "end of tape" ("EOT") hole 54 and (just upstream from hole 54) an "early warning" or "EW" hole 56. As shown in FIG. 3, the holes $50_1$, $50_2$, 52, 56, and 54 are all vertically aligned. It should be understood that additional pairs of BOT holes and EW holes can be (and generally are) provided.

Between beginning edge 22A of tape 22 and the lower set 40L of stripes is a cartridge log 60 which is recorded on tape 22 in a manner hereinafter explained. As shown in FIG. 3, cartridge log 60 is recorded at a substantially vertical midpoint of tape 22. As also explained below, cartridge log 60 comprises a plurality of "directory" or "cartridge log" blocks $CL_{00}$-$CL_{LAST}$.

As shown in FIG. 1, tape drive system 20 (also known as a tape "deck" system) includes a deck assembly section 70. Deck assembly 70 in turn includes head unit 28 which has mounted thereon two write elements $30W_F$, $30W_R$ and two read elements $30R_F$, $30R_R$ (all such elements being collectively represented by reference numeral 30 in FIG. 1). Tape drive system also includes other sensors (particularly hole optical sensor 72 and unillustrated write protection and tape present sensors). Hole sensor 72 is employed as hereinafter described in optically detecting the aforementioned holes $50_1$, $50_2$, 52, 56, and 54.

Deck assembly 70 further includes means for positioning head unit 28 in the vertical direction depicted by arrow 34. In particular, head unit 28 is mounted on a head positioner or "element positioner" 74 (see FIG. 2) which includes a positioner motor 76. In the illustrated embodiment, positioner motor 76 is a stepper motor which vertically incrementally repositions head unit 28 relative to a width dimension of tape 22 in conventional manner. As used herein, the width dimension of tape 22 refers to the vertical direction depicted by arrow 34, and thus is orthogonal to the horizontal direction depicted both by forward direction arrow 24 and reverse direction arrow 26.

In conventional manner, deck assembly 70 also includes a capstan motor 78 which serves to rotate an unillustrated capstan. The capstan is in contact with an unillustrated cartridge drive mechanism which transports tape 22 in the horizontal direction (either forward or reverse, depending on the direction of drive applied to capstan motor 78) during recording and reading operations.

As also shown in FIG. 1, tape drive system 20 includes a basic drive control section 80. Drive control section 80 includes a drive or transport controller 82 which is connected via various circuits to hardware installed in deck assembly 70. For example, transport controller 82 is connected through motor control driver 84 to capstan motor 78; through positioner circuitry 86 to positioner motor 76; and, through hole sensor circuitry 88 to hole sensor 70.

Basic drive control section 80 also includes a write driver circuit 90; a read circuit 92 ("read data separater PLL"); and, circuitry 94 for power on, reset, and voltage monitoring. Write driver circuit 90 is connected inter alia to apply recording signals to the two write elements $30W_F$, $30W_R$ during recording operations, whereas read circuit 92 is connected to receive and process signals from the two read elements $30R_F$, $30R_R$ during reading or read-after-record operations.

As further shown in FIG. 1, tape drive system 20 includes an interface control section 100. Interface control section 100 comprises an processor 102 which communicates with other constituent members of interface control section 100 in conventional manner using a microprocessor bus 104. In particular, microprocessor 102 communicates over bus 104 with a formatter/encoder 110; a data buffer controller 112; a SCSI protocol chip 114; EPROM 116; SRAM 118; and, drive display indicators (LEDs 120).

SCSI protocol chip 114 is connected to a connector terminal 130 for communication with an unillustrated host device (e.g., a host computer or data processing system for which drive system 20 serves as a peripheral). In a record operation, user data is received from the host under control of SCSI protocol chip 114 and applied on data bus 132 to a data compression controller 134. In a read operation, data read from tape 22 and de-compressed by controller 134 is applied under control of SCSI protocol chip 114 to the host. Data compression controller 134 performs data compression/decompression in conventional manner with the aid of compression RAM 136 to which it is connected by bus 138.

Data buffer controller 112 is connected to data compression controller 134 by data bus 140, and to formatter/decoder 110 by bus 142. Further, data buffer controller 112 is connected to control the storage and retrieval of information from data buffer 144.

Processor 102 serves as a master processor for servant transport controller 82. A serial data link 150 is provided between processor 102 and transport controller 82.

As further illustrated in FIG. 1, formatter/encoder 110 is connected to apply formatted data to write driver 90 and to receive read data for decoding from read circuit 92.

RECORDING OPERATION

During a recording process, user data is received from the unillustrated host under supervision of SCSI controller 114 and applied via bus 132 to data compression controller 134 for compression. The compressed user data is stored in data buffer 144 for application to formatter/encoder 110. Formatter/decoder 110 prepares blocks of data (referred to as "data blocks") for application to write driver circuit 90 and ultimately for application to an appropriate one of write elements $30W_F$, $30W_R$. Control and coordination of controllers 114, 134, 112, and formatter/decoder 110 is accomplished by processor 102.

In accordance with prior art practice, the data blocks prepared by formatter/decoder 110 each include a preamble, header (e.g., control field), user data, and a postamble as previously explained. The header of each data block includes a block number assigned by the formatter/decoder 110. Typically, block numbers are sequentially assigned in order of generation by formatter/decoder 110. As illustrated, for example, in FIG. 3, track $B_{00}$ has block numbers represented as $B_{00\text{-}0001}$ through $B_{00\text{-}LAST}$.

Figure 4:
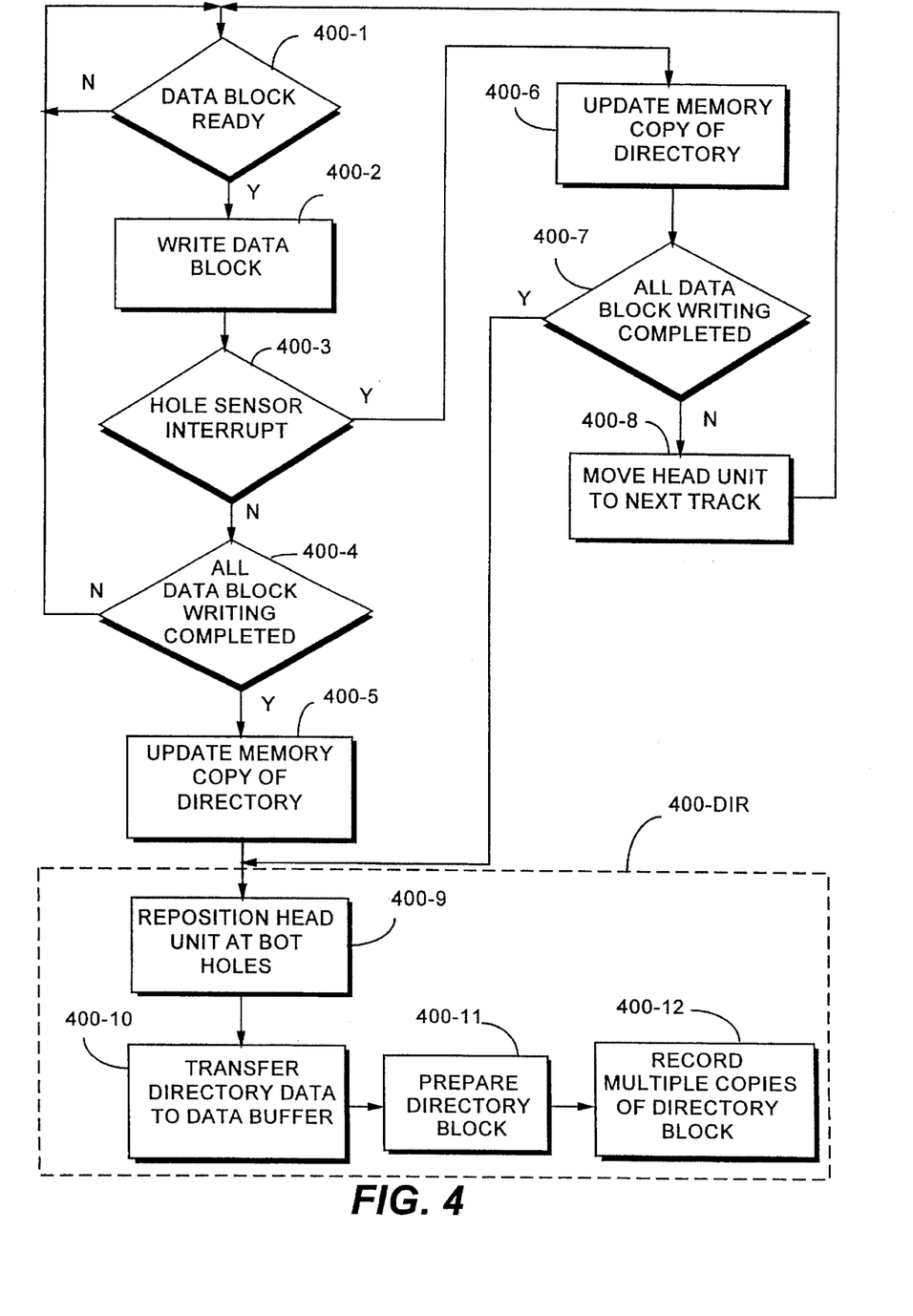
FIG. 4 is a flowchart showing steps executed in the preparation and recording of an end-of-track block directory by the drive of FIG. 1.

FIG. 4 is a flowchart showing steps executed in the preparation and recording of an end-of-track block directory by the drive system 20 of FIG. 1. At step 400-1, processor 102 determines that another data block has been prepared by formatter/decoder 110 and is ready for recording on tape 22. At step 400-2, the data block is actually recorded on tape 22 by application to write driver circuit 90 and one of write elements $30W_F$, $30W_R$. If tape 22 is being transported by the capstan in the forward direction of arrow 24, write element $30W_F$ is employed. If tape 22 is being transported by the capstan in the reverse direction of arrow 26, write element $30W_R$ is employed.

If, during recording of a data block, hole sensor 72 encounters a hole on the tape, transport controller 82 interrupts microprocessor 102. In this regard, when head unit 28 is travelling in the forward direction depicted by arrow 24, near tape trailing edge 22B hole sensor 72 will optically detect an "early warning" hole EW 56. Similarly, when head unit 28 is travelling in the reverse direction depicted by arrow 26, near tape leading edge 22A hole sensor 72 will optically detect hole LP 52. When the hole sensor 72 detects a hole, hole sensor circuitry 88 interrupts transport controller 82, which in turn advises processor 102.

Thus, as reflected by step 400-3, processor 102 determines if a hole sensor interrupt occurs. If a hole sensor interrupt is not detected at step 400-3, processor 102 realizes that head unit 28 has not yet reached an end of track. Processor 102 then (at step 400-4) checks to determine if the recording of all data blocks has been completed.

If it is determined at step 400-4 that data blocks remain for recordation on tape 22, processor returns to step 400-1 for processing the next data block to be recorded. If no further data blocks remain for recording, processor 102 executes step 400-5 and then a directory recording operation involving steps flamed by broken line 400-DIR.

If, at step 400-3, processor 102 determines that a hole sensor interrupt occurred (e.g., that head unit 28 has reached a track corner), processor 102 updates an end-of-track directory stored in SRAM 118. In particular, in the illustrated embodiment, at step 400-6 processor 102 causes the block number of the last data block recorded on a track to be entered into an appropriate location for that track in the end-of-track directory.

Figure 6:
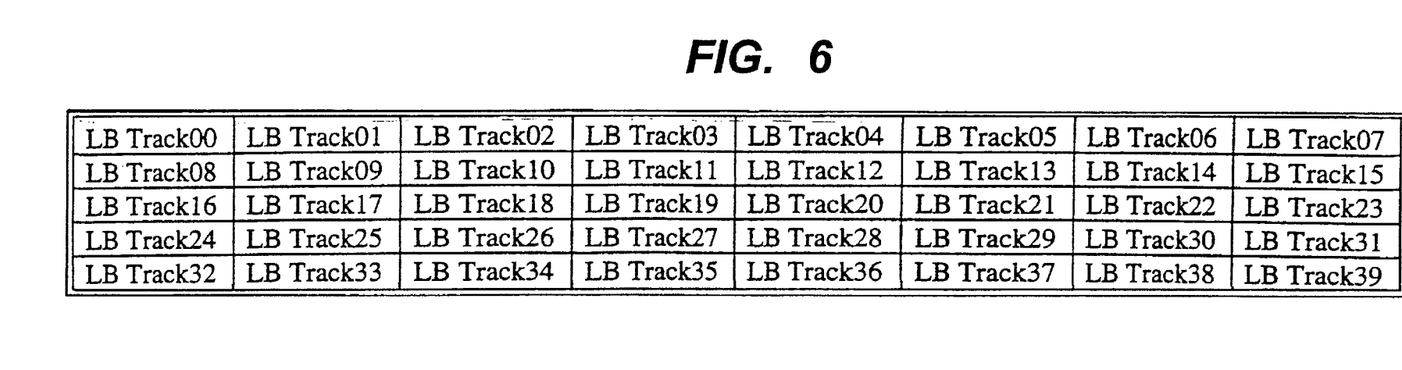
FIG. 6 is a graphical representation showing a format of a directory stored by the drive of FIG. 1 and in particular a relationship between memory locations of the directory and track numbers.
Figure 7:
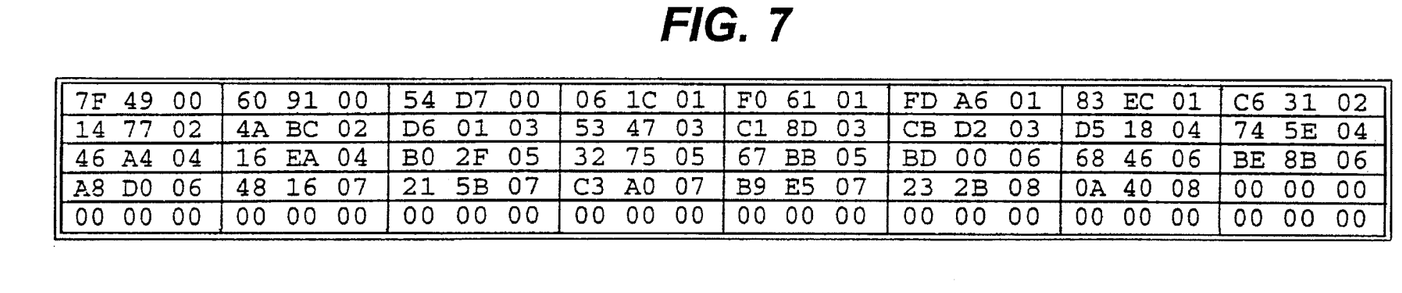
FIG. 7 is a graphical representation illustrating exemplary contents of memory locations of a directory recorded by the drive of FIG. 1.
Figure 8:
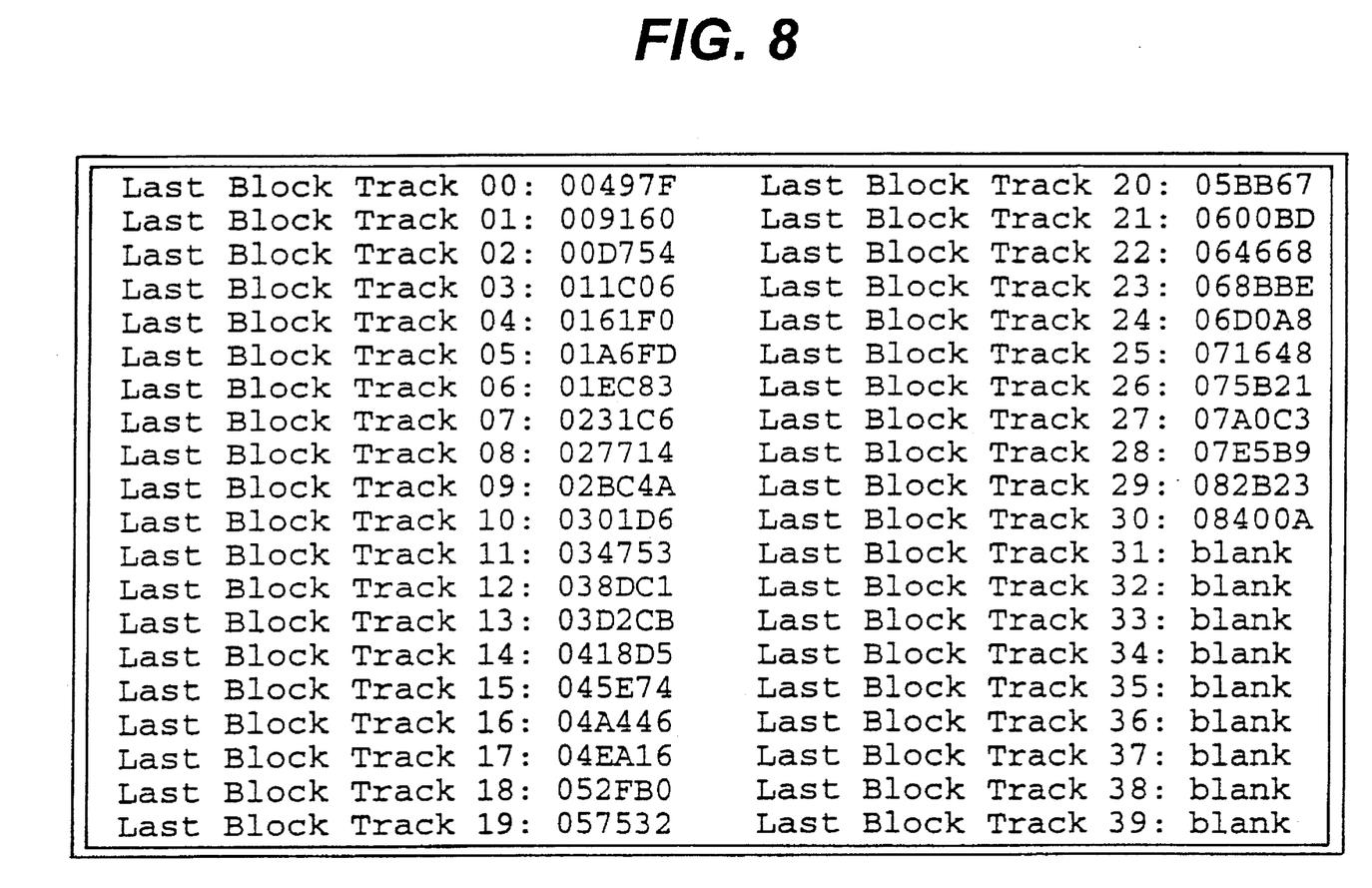
FIG. 8 is a chart listing the exemplary data block numbers of FIG. 7 stored in the directory according to the format of FIG. 6.

The format of the end-of-track directory is understood with reference to FIG. 6, FIG. 7, and FIG. 8. The end-of-track directory is conceptualized as an array including a location for each track. In the illustrated embodiment, forty locations are provided in the end-of-track directory in view of the provision of forty tracks across tape 22. FIG. 6, viewed in conjunction with FIG. 3, shows a mapping of array locations to track numbers. FIG. 7, on the other hand, shows example actual block numbers stored in the end-of-track directory. It is to be noted that the block numbers in FIG. 7 are illustrated with the least significant byte of the logical block shown first.

FIG. 8 is a chart listing the exemplary data block numbers of FIG. 7 stored in the end-of-track directory according to the format of FIG. 6. Thus, for example, using the sample block numbers shown in FIG. 7, it can be seen from FIG. 8 that the block number stored in the end-of-track directory at step 400-6 for track $B_{02}$ is 00D754 (shown as 54 D7 00 in FIG. 7).

After the end-of-track directory in SRAM 118 is updated by processor 102 at step 400-6, at step 400-7 processor 102 (in like manner as step 400-4) checks if all data block recording has been completed. If so, processor 102 jumps to step 400-9 of the directory recording operation involving steps framed by broken line 400-DIR. If not, at step 400-8 head unit 28 is moved to the next track. In this regard, processor 102 directs transport controller 82 to send signals to positioner circuit 86 so that positioner motor 76 will vertically reposition head unit 28, whereby the appropriate one of the write elements $30W_F$, $30W_F$ will be properly situated vertically with respect to the width of tape 22 for recording the next track. Processor 102 returns to step 400-1 to obtain the next data block.

At step 400-5, processor 102 updates the memory copy of the directory in SRAM 118. Step 400-5 is executed in order to update the directory in the usual event that data blocks are recorded on the last track recorded without filling the track.

Steps 400-9 through 400-12 (framed by broken line 400-DIR) involve recording directory blocks CL on tape 22. At step 400-9, processor 102 causes head unit 28 to be repositioned at the upstream-most BOT holes $50_1$, $50_2$, with write head $30W_F$ being vertically aligned with track $B_{00}$. The man skilled in the art will understand that processor 102 (always knowing the vertical position of head unit 28) can (at step 400-9) send signals to transport controller 82 for causing positioner motor 76 to return write element $30W_F$ to track position $B_{00}$. Similarly, also at step 400-9 processor 102 sends signals to transport controller 82 causing capstan motor 78 to rewind tape 22 until holes LP 52, BOT $50_2$, and BOT $50_1$ are sequentially encountered. When write element $30W_F$ is thus positioned upstream from the beginning of stripe $B_{00}$, write element $30W_R$ is in a position for recording a first directory block $CL_{00}$ in the position shown in FIG. 3 (e.g., vertically proximate track $B_{01}$).

Step 400-10 depicts the fact that the contents of the end-of-track directory as stored in SRAM 118 are transferred over bus 104 and via data buffer controller 112 to data buffer 144. The reader should understand that this transfer could occur even earlier than depicted in FIG. 4.

Step 400-11 reflects the fact that processor 102 requires formatter/decoder 110 to prepare a block of information which includes the end-of-track directory. A block prepared at step 400-11 is termed a "directory block" or "cartridge log block". As with other blocks prepared by formatter/decoder 110, a directory block CL includes a preamble, a header, a data region, and a postamble. The data region of the directory block includes the end of block directory schematically illustrated by the examples of FIG. 6 and FIG. 7. It should be understood that a directory block CL can include information other than end-of-track blocks numbers, but such other information (e.g., statistical information such as number of blocks recorded, number of error corrections) is not germane to the present invention.

At step 400-12 multiple copies of the directory block (denoted as blocks $CL_{00}$–$CL_{LAST}$ in FIG. 1) are recorded by write head $30W_R$ as tape 22 is moved in the reverse direction. Advantageously, the directory blocks $CL_{00}$–$CL_{LAST}$ are recorded in an area of tape not utilized for user data. Thus, recording and updating directory blocks $CL_{00}$–$CL_{LAST}$ does not require a splicing operation affecting downstream user data. Moreover, as recording of directory blocks $CL_{00}$–$CL_{LAST}$ occurs on the heels of a rewind (e.g., movement of tape 22 in the reverse tape direction), recording directory blocks $CL_{00}$–$CL_{LAST}$ in the reverse tape direction obviates a change of tape direction.

SEARCH OPERATION

Figure 5:
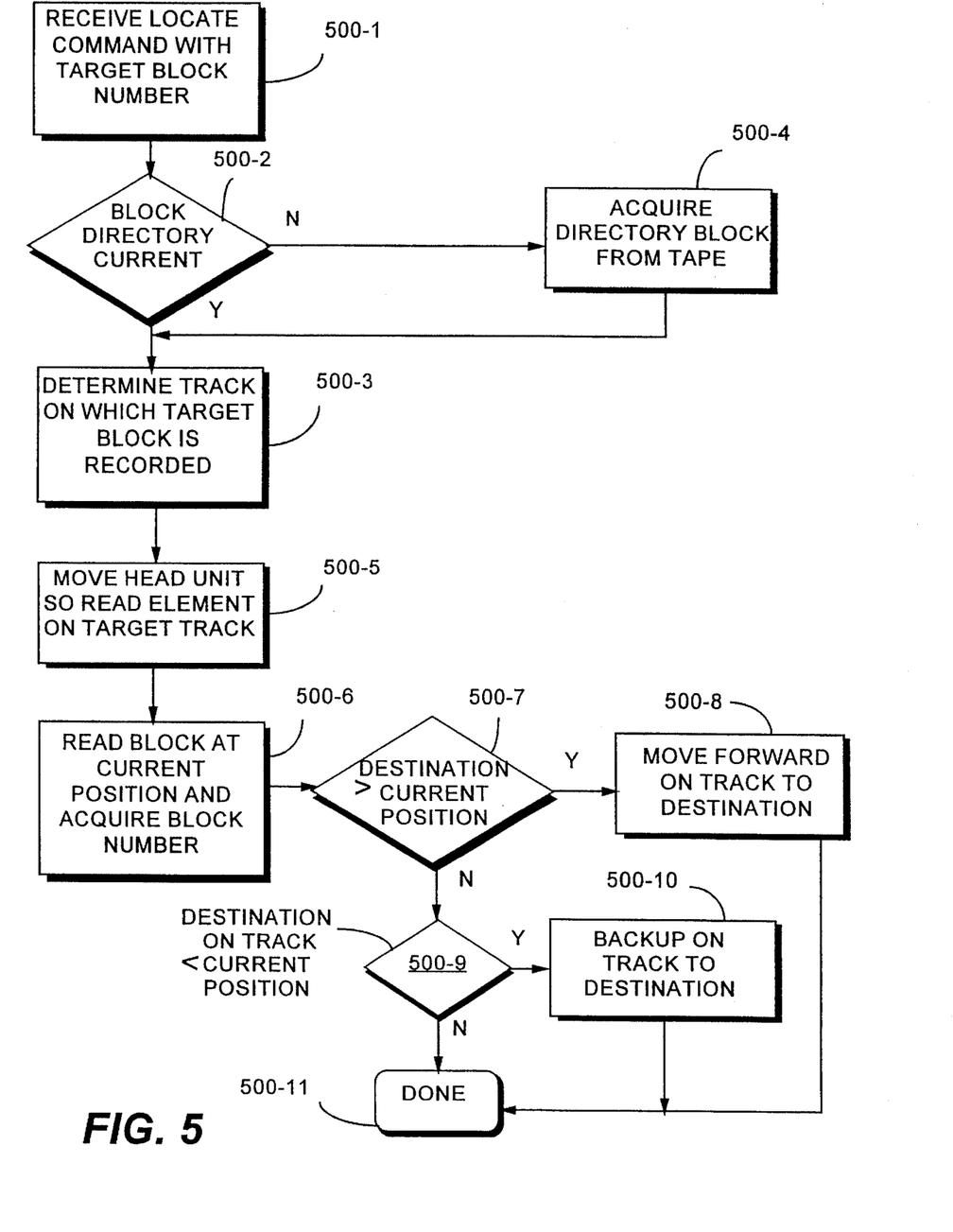
FIG. 5 is a flowchart showing steps executed by the drive of FIG. 1 in utilizing an end-of-track block directory to locate a target data block.

FIG. 5 is a flowchart showing steps executed by drive system 20 of FIG. 1 in utilizing an end-of-track block directory to locate a target data block in a search operation.

A search or locate operation is typically commenced by receipt of a locate command at SCSI controller 114 from the host (as reflected by step 500-1). Upon receipt of such a command, processor 102 determines (at step 500-2) whether an end-of-track directory for the tape being read exists in SRAM 118 and (if so) whether such directory is current. If the directory in SRAM 118 is current, processor continues execution at step 500-3 using the directory contents of SRAM 118. Otherwise, as depicted at step 500-4, processor 102 must obtain a directory block CL recorded on tape 22.

The man skilled in the art will understand, given the format of FIG. 3 and the location of the directory blocks $CL_{00}$–$CL_{LAST}$ thereon, how (at step 500-4) processor 102 directs transport controller 82 (and thereby the circuits 84, 86 88) so that a read element $30R_R$ is positioned to read the directory blocks. End-of-track directory information read from a directory block is then stored in SRAM 118 at step 500-4.

At step 500-3 processor 102 determines the track number on which the target block is recorded. In this regard, processor 102 consults the end-of-track directory (such as that example illustrated in FIG. 7) to determine to which track a read element 30R should be positioned for searching for the target block. Knowing the block number of the target block, and (from the directory) the block numbers of the last blocks recorded on consecutive tracks, processor 102 can determine between which block numbers in the directory the target block lies, and thereby determine a track upon which the target block resides.

In accordance with the determination of step 500-3, at step 500-5 processor 102 directs transport controller 82 to move head unit 28 so that the appropriate read element 30R is positioned to read the track upon which the target block is known to reside. As understood from the foregoing, which read element $30R_F$, $30R_R$ is to be employed depends on the track number (since even numbered tracks are recorded/read in the forward direction and odd numbered tracks are recorded/read in the reverse direction). Execution of step 500-5 thus involves control of capstan motor 78 and positioner motor 76 by transport processor 82.

At step 500-6 the appropriate read element $30R_F$, $30R_R$ reads a data block encountered on the track to which it has been moved, the block number of which becomes the "current" block number on the "current" track. Then, at step 500-7, processor 102 determines whether the target block number is greater than the current block number.

If the determination at step 500-7 is affirmative, at step 500-8 processor 102 requests that a read operation be conducted on the current track for obtaining data blocks with ascending block numbers until the target block number is read. Otherwise, at step 500-9 processor 102 determines whether the target block number is less than the current block number. If the determination at step 500-9 is affirmative, at step 500-10 processor 102 requests that a read operation be conducted on the current track for obtaining data blocks with descending block numbers until the target block number is read. Step 500-11, to which processor 102 jumps after execution of either steps 500-8, 500-9, or 500-10, signifies completion of the locate/search operation.

Thus, the end-of-track directory featured by the present invention facilitates rapid and accurate location of target blocks without sequential searching for track positioning. Provision of the end-of-track directory facilitates an essentially immediate determination of track number, without having first to read a plurality of tracks in order to determine upon which track a target block should be located.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. Apparatus for recording information on a storage medium; the apparatus comprising:

a write element for at least recording information on the storage medium;

a medium transport for transporting the storage medium horizontally past the write element;

an element positioner for positioning the write element relative to a width of the medium;

a formatter for preparing data blocks for recording on the storage medium by the write element, each data block having an associated data block number;

a memory for storing a directory;

a transport controller for controlling the medium transport and the positioner for recording a plurality of horizontal tracks on the medium and for detecting an end of a track on the medium;

a processor connected to the transport controller and to the formatter updating the directory to include a block number of a track at an end of a track responsive to the end of track detection and wherein the processor causes the write element to record the directory at a predetermined position on the medium.

2. The apparatus of claim 1, wherein the predetermined position is at beginning of tape.

3. The apparatus of claim 1, wherein for each track the processor stores in the directory the block number of the block last recorded on the track.

4. The apparatus of claim 1, further comprising:

means for communicating a target data block number to the processor; and a read element vertically positionable by the element positioner for reading information recorded on the medium; and wherein the processor directs the transport controller to position the read element at the predetermined position on the medium for reading the directory;

wherein the read element reads the directory from the storage medium;

wherein the processor compares the target block number with the data block numbers stored in the directory and, in response to the comparison, causes the element positioner via the transport controller to position the read element with respect to the width of the medium so as to read the track upon which the data block having the target data block number is recorded.

5. The apparatus of claim 1, wherein processor causes the write element to record a plurality of copies of the directory at the predetermined position on the medium.

6. The apparatus of claim 5, wherein the predetermined position is at beginning of tape.

7. The apparatus of claim 6, wherein the copies of the directory are recorded in reverse direction order on the storage medium.

8. The apparatus of claim 1, wherein the medium is magnetic storage medium.

9. A method of recording on a storage medium using an apparatus in which the medium is transported past a vertically positionable write element for recording information on a plurality of horizontal tracks on the storage medium, the method comprising:

(1) preparing data blocks for recording on the storage medium by the write element, each data block having an associated data block number;

(2) transporting the storage medium horizontally past the write element;

(3) recording at least one horizontal track on the medium;

(4) detecting an end of truck;

(5) updating a directory in a memory to include a block number of a track at an end of a track responsive to the end of track detection, the data block number of the data block recorded at an end of the horizontal track;

(6) recording the directory at a predetermined position on the medium.

10. The method of claim 9, wherein prior to repeating step (5) the write element is repositioned vertically with respect to a width of the medium after a data block is recorded at an end of the track, and at least steps (2)–(4) repeated for recording at least one further horizontal track on the medium.

11. The method of claim 9, wherein the predetermined position is at beginning of tape.

12. The method of claim 9, wherein for each track the block number of the block last recorded on the track is stored in the directory.

13. The method of claim 9, wherein processor causes the write element to record a plurality of copies of the directory at the predetermined position on the medium.

14. The method of claim 13, wherein the predetermined position is at beginning of tape.

15. The method of claim 14, wherein the copies of the directory are recorded in reverse direction order on the storage medium.

16. The method of claim 9, wherein the medium is magnetic storage medium.

* * * * *